Figure 1:
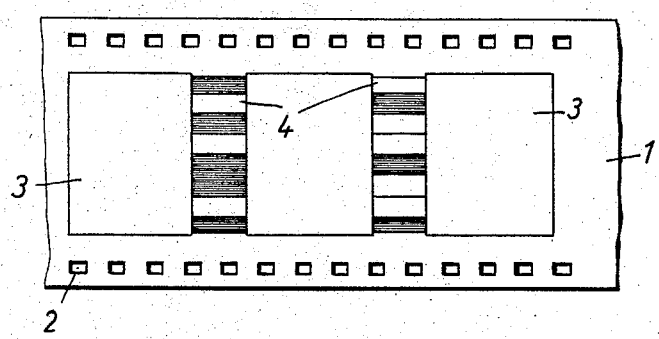

United States Patent Office 3,344,534
Patented Oct. 3, 1967

3,344,534
TEACHING APPARATUS
Herbert Anschütz, Viernheim, and Norbert Weyss, Mannheim-Kafertal, Germany, assignors to Brown, Boveri & Cie, Aktiengesellschaft, Mannheim-Kafertal, Germany, a corporation of Germany
Filed Apr. 22, 1965, Ser. No. 449,997
Claims priority, application Germany, Apr. 25, 1964, B 76,508
7 Claims. (Cl. 35—9)

Our invention relates to teaching machines. More particularly, it relates to an improved teaching machine which permits a comparatively wide diversity of teaching techniques yet is relatively simple and comparatively inexpensive.

The use of automated and mechanized teaching machines has become quite widespread. These machines may vary in complexity from a very simple type to complex electronic computer types with their necessary associated peripheral equipment. Thus, the simplest type of teaching machine may merely be a paper strip having a text thereon comprising questions and answers. Such strip may be wound on a reel and may be moved past the windows of a closed box, the movement of the strip being controllable externally by a winding device.

A more complex type of teaching machine may be one where the materials desired to be taught may be contained on magnetic tape in a programmed order and wherein the student may orally state just acquired knowledge which is simultaneously recorded on the tape in juxtaposition with related subject matter on the tape whereby a controlled comparison and a checking of the learning process may be obtained.

Where difficult and relatively advanced subjects are to be taught, it is desirable to employ in addition to visual and oral textual depictions, supplementary teaching aids such as tape recorders, slides, moving pictures, and the like. It is also desirable to maintain a continuing check on the progress of the learning process and the acquisition of knowledge by the student through periodic tests. It is further advantageous to present the subject matter to be taught in various different manners.

It is readily appreciated that where the teaching systems comprise a variety of supplementary teaching aids, testing arrangements, different manners of presenting the same and different subject matters, etc., the expense thereof increases at a steeply ascending rate. In fact, teaching machines exist which can be considered as constituting an entire teaching system or installation.

Accordingly, it is an important object of this invention to provide a teaching machine which enables a comparatively wide degree of diversity in teaching techniques but which is comparatively inexpensive compared with known teaching machines capable of such diversity.

Generally speaking and in accordance with the invention, there is provided in automatically controlled teaching apparatus, strip means having spaced first frames thereon designated by respective different first numbers containing intelligible graphic subject matter, first areas connecting the first frames and containing a chosen number of information bits thereon for respectively deriving therefrom first binary combinations of electrical signals representing the first numbers, spaced second frames thereon designated by respective different second numbers containing a plurality of combinations of information bits thereon representing a plurality of steps in a predetermined teaching program pertinent to a particular frame and the address of the next frame of the program, and second areas connecting the second frames containing a given number of information bits thereon for respectively deriving therefrom second binary combinations of electrical signals representing the second numbers. There are further provided a first device for displaying the first frames and a second device for scanning the second frames to produce binary combinations of electrical signals representing the steps. First and second control registers are included for containing therein settings of the binary combinations of electrical signals representing the frame numbers, and moving means are provided for moving the strip means, the moving means including means for scanning the first and second areas to derive the first and second binary combinations of electrical signals. Control means are provided responsive to the application thereto of the settings in the control registers and the first and second binary electrical signal combinations for halting the moving means upon the matching of the control register settings and the first and second binary combinations. Means are provided for generating a plurality of binary combinations of electrical signals respectively representing different commands, the control means being responsive to the application thereto of such commands and to the combinations of electrical signals representing the steps for effecting the commands and for carrying out the aforesaid steps.

Figure 2:
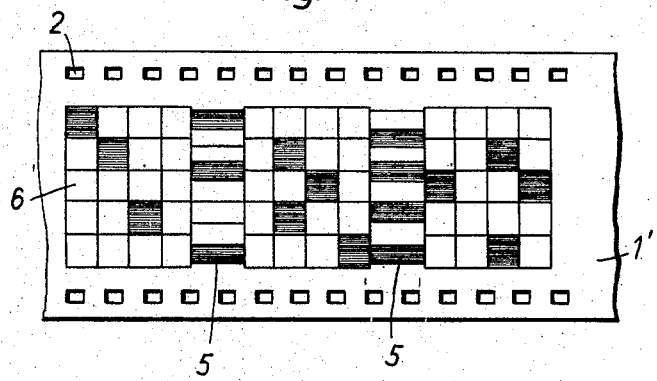
Figure 3:
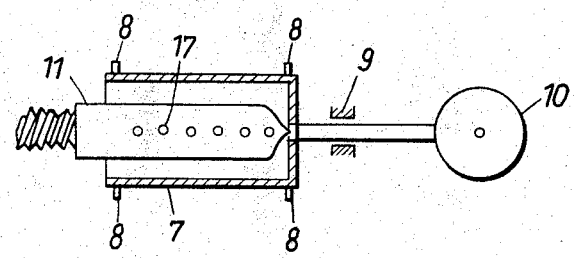
Figure 4:
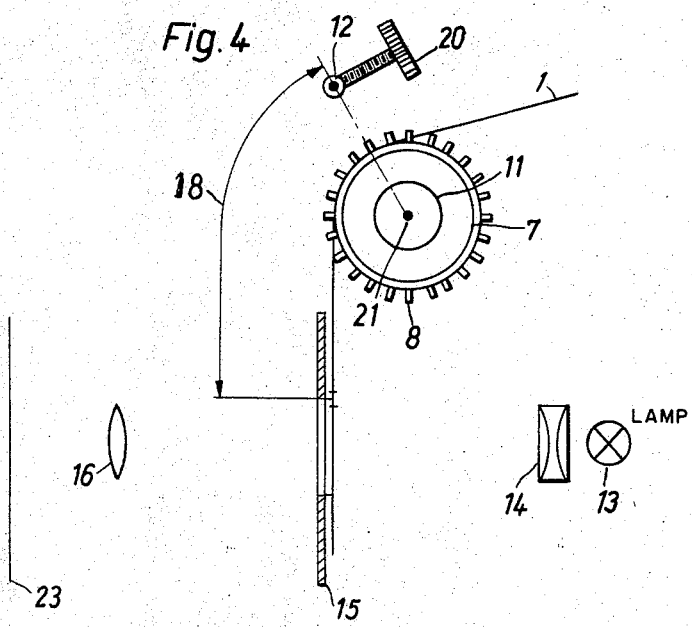
Figure 5:
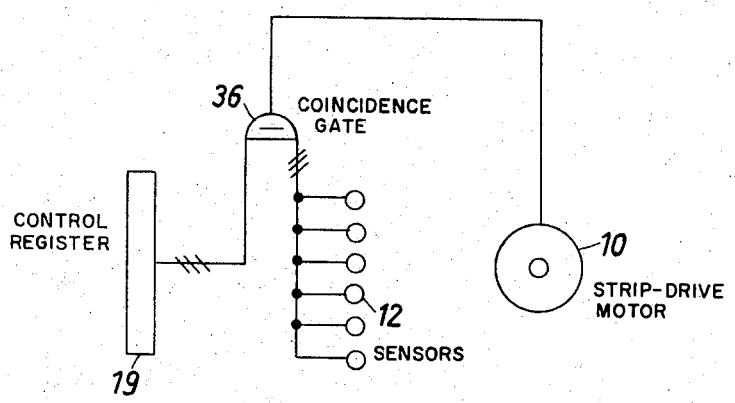
Figure 7:
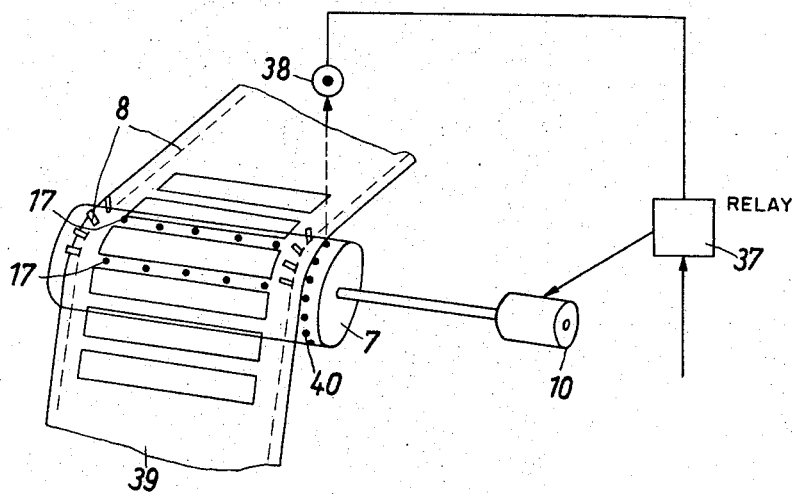
Figure 6:
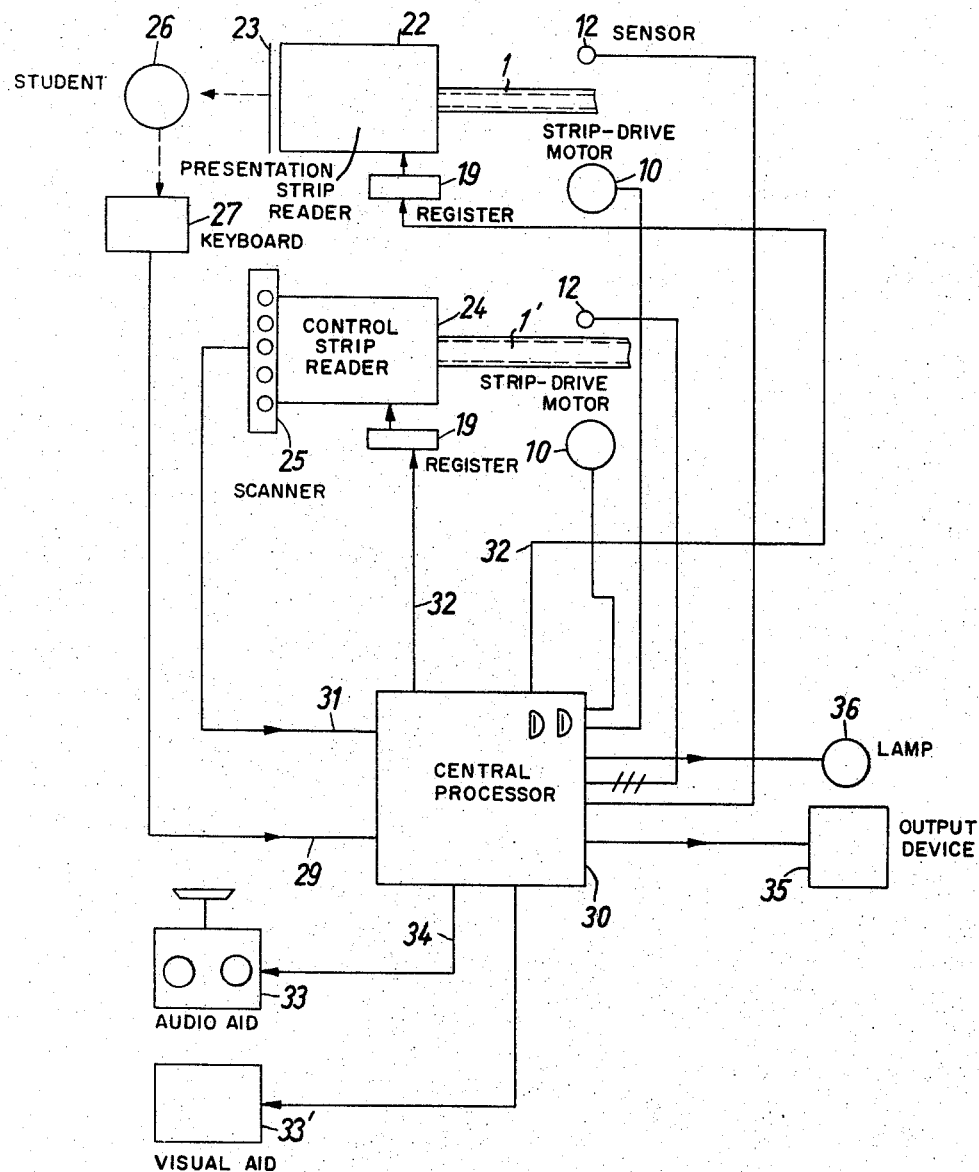

The above mentioned and more specific objects and features of our invention will be apparent from, and will be mentioned in the following description of the teaching apparatus according to the invention shown by way of example in the accompanying drawing in which FIG. 1 shows a portion of a graphic subject matter presentation strip constructed in accordance with the principles of the invention. FIG. 2 shows a portion of a control strip, FIG. 3 is a schematic depiction of an arrangement for moving the strips and for scanning the coded areas situated between the frames on the strips, FIG. 4 is a sectional view of the apparatus shown in FIG. 3 and further including an optical arrangement utilized in conjunction therewith, FIG. 5 shows a circuit arrangement for locating particular frames on the strips, FIG. 6 is a block diagram of a system circuit constructed according to the invention, and FIG. 7 shows an alternative embodiment of a scanning arrangement for the frames of the control strip.

Referring now to FIG. 1, there is shown a presentation strip 1 suitable for use according to the invention. Strip 1 comprises spaced registered perforations 2 disposed longitudinally near each edge of the strip for adapting the strip to be moved by a sprocket wheel and includes substantially equispaced like-sized rectangular frames 3 with coded areas 4 provided between frames 3. Frames 3 have displayed thereon subject matter presented to the one being taught and coded areas 4 comprise light and dark fields which can be sensed by photosensitive means to derive electric signals representative of the codes therein. The strip shown in FIG. 1 is conveniently designated as the presentation strip.

In FIG. 2, the strip 1' contains the edge disposed perforations 2, equispaced like-sized rectangular frames 6 and coded areas 5. Coded areas 5 in the strip of FIG. 2 are similar in appearance and function to coded areas 4 in the strip of FIG. 1 but frames 6, unlike frames 3 of the strip of FIG. 1, do not contain graphic subject matter intelligible to a viewer thereof but light and dark fields also representative of a code which can be sensed by photosensitive means to provide electric signals representative of such code. This strip 1' is suitably designated as the control strip.

In the operation of the invention using the strips of FIGS. 1 and 2, the frames of the presentation strip such as strip 1 contains the material to be taught broken up into teaching steps by frames. The frames 6 of the strip 1' of FIG. 2 contain the information for effective automatic control of the teaching program as is further explained hereinbelow. The coded areas 4 and 5 respectively serve to effect the selection of a chosen presentation frame 3 and a control frame 6.

The presentation strip 1 is suitably of film and both the graphic subject matter in frames 3 thereof or the light and dark fields in coded areas 4 can simultaneously be provided thereon in the same photographic process. The control strip 1' shown in FIG. 2 may also be of film. However, since it contains coded information thereon which is utilized to provide electrical signal representations, it may also be perforated tape, magnetic tape and the like.

Where perforated tapes are utilized as the control strips, a given number of successive lines may correspond to a frame. These lines may successively contain information for the switching in of a frame and the switching in of other teaching aids such as audio, visual and the like. A group of five lines has been found to be a convenient number. Thus, with such arrangement using perforated tape, the lines of a group corresponding to a frame may be simultaneously or successively addressed to obtain and absorb the teaching information resulting from such addressing and, after an interval as determined by the one being taught, another group of lines corresponding to another frame may be addressed.

Alternatively, the control strips which can be used may be transparent strips, strips made of strong paper with or without edge perforations, motion picture film strips, photographic paper strips, and the like. As shown in FIG. 2, where the control strip 1' is made of film, the teaching program in a frame is represented in the form of light and dark fields arranged in lines and columns. Here, as in the case of perforated tape, each frame can comprise a group of lines in which one line can contain the command code for advancing the main presentation on presentation strip 1 and the other lines can respectively contain the codes for switching in other aids such as audio, visual and the like whereby a group addressing is enabled utilizing photoresponsive means. In a frame 6 in FIG. 2, if the number of lines is designated by the letter $n$ and the number of cloumns is designated by the letter $m$, it is seen that each frame contains $nm$ control bits of information.

In FIG. 3 which schematically depicts a suitable arrangement for moving the strips, a hollow cylindrical film sprocket wheel 7 having sprockets 8 thereon is driven by a motor 10. Sprocket wheel 7 is suitably supported on one side by a bearing 9 and is open on the side distal to the driving mechanism whereinto a tubular lamp 11 extends. Equispaced holes 17 are provided linearly arranged on a tangential line of the circumference of wheel 7, the number and spacing of holes 17 being chosen to correspond to the number and widths of the fields in coded areas 4 and 5 whereby they fall into registration therewith as a strip is moved along wheel 7. The light from lamp 11 passes through holes 17 and depending upon whether it encounters a light or a dark field from coded areas 4 and 5 determines whether a respective electric signal is generated by a photosensitive device (such as the photosensitive means 12 shown in FIG. 4).

FIG. 4 which is a sectional view of the arrangement shown in FIG. 3 in conjunction with an optical arrangement depicts the sprocket wheel 7 having sprockets 8 thereon with tube 11 substantially concentrically disposed within the wheel. The optical arrangement comprises a lamp 13 in line with and spaced from a condenser 14, a frame shutter 15 and a lens 16, all of the latter being optically aligned. The circumference of sprocket wheel 7 is chosen to be an integral multiple of the distance between the leading edges of successively occurring frames. Correspondingly, there are provided at proper intervals along the circumference of wheel 7, the same multiple of lines of holes 17 in like tangential disposition. With such arrangement, it is assured that the relative position of the lines of holes 17 on wheel 7 and the coded areas 4 or 5 on the strip is constantly maintained. Thus a starting condition of the dimensions of the arrangement of FIG. 4 is the diameter of wheel 7 which is in turn determined by the distance between the leading edges of successively occurring frames. The distance 18 between the upper edge of the aperture of shutter 15 and the upper end of the line connecting the center axial line 21 of tube 11 and photoelectric cell 12 as measured in the line of the path of the film strip is chosen to equal an integral multiple of the distance of the object 23. To enable the fulfilling of the latter condition, a screw 20 is provided for varying the position of photoelectric cell 12 angularly around axial line 21. Thus, with the arrangement shown in FIG. 4, it is insured that during movement of the strip on sprocket wheel 7 by a whole number of frames, light from tube 11 passing through a line of perforations 17 and coded areas will always fall on photosensitive means 12 whereby the advancing of the film can be controlled by a motor 10. The mechanism of such control is shown in FIG. 5.

In FIGS. 5 and 6, stage 19 shown therein depicts a control register which may comprise switching devices such as electromechanical relays, electronic or semiconductor flip-flop circuits, or other suitable storage devices. A photosensitive means 12 (FIG. 5) is shown as comprising a plurality of photo resistors whose number corresponds to the number of discrete fields in a coded area. If control register 19 is chosen to comprise eight switching devices, photosensitive means 12 chosen to have eight photo resistors (only six are shown for convenience in FIG. 5), a line 17 has 8 holes, and a coded area is chosen to have eight discrete fields, then $2^8$, i.e., 256 binary code combinations are made possible in a straight binary coded arrangement in control register 19, and 100 combinations are made possible in control register 19 if it comprises a binary coded decimal counter, i.e., two decades, each comprising four switching devices. Thus, with eight parallel arranged bits in each coded area, up to 256 or 100 frames can be respectively designated and selected. The respective outputs of control register 19 and photosensitive means 12 are applied to a correlation circuit or equivalence 36 which may suitably be a logical gating arrangement for matching such respective outputs. When an identity of such outputs exists, circuit 36 is enabled.

As will be further explained in connection with the description and explanation of operation of FIG. 6, the teaching machine constructed in accordance with the principles of the invention contemplates an arrangement such as that shown in FIG. 5 both for the presentation strip and the control strip. The arrangement of correlation circuits 36 may be so chosen that when they are not enabled, the respective control motors 10 run until the desired frames in the strips as determined by the coding of the coded areas match the contents of the control registers 19. When the matchings are made, circuits 36 are enabled to halt the respective motors 10. It is to be understood that respective motors 10 can be arranged to run both in a forward and reverse direction during the search for matching control registers settings and coded areas.

In FIG. 6, which is a block diagram of the electrical system of a teaching machine constructed in accordance with the principles of the invention, stages therein which have already been referred to in the description of the structures shown in FIGS. 1 to 5 have been designated with the same numerals.

In FIG. 6, the instrument or device for displaying the presentation strip, designated as presentation strip reader 22 and which contains an optical system such as shown in FIG. 4, has associated therewith a ground glass screen or white surface 23 on which a frame from presentation strip 1 is projected and off which the one being taught shows the presented material. On the presentation strip 1 which is shown extending into device 22 the coded areas 4 are not shown for convenience in depiction and explanation since they function to internally control the device 22, such coded areas being covered by shutter 15 (FIG. 4). Similarly, a reading instrument or device 24 is provided into which the control strip 1' is fed. In device 24, a photosensitive scanning means 25 is provided associated therewith, rather than a screen such as screen 23, and comprises an array of photosensitive devices which corresponds to the rectangular pattern of control bit fields in a frame 6 of a control strip 1' (FIG. 4). Respective control registers 19, as described in connection with FIG. 5, are associated with reading devices 22 and 24 and in conjunction with respective motors 10 and respective photosensitive means such as means 12 shown in FIG. 5, control the selection of the particular frames on each strip. In this connection, it is, of course, understood that numbers are suitably inserted into the control registers which designate particular corresponding presentation and control, and the searching operation as described in connection with the arrangement depicted in FIG. 5 effects the selection of the frames in reading devices 23 and 24. The scanning means 25 detects the information on the control frame and the representative electric signals generated thereby determines the teaching program for a particular frame.

Thus, in operation, the student, 26 studies the information on the frame being presented on screen 23 of reading device 22. A keyboard 27 then enables the student to present information to the machine as to what degree he has understood and mastered the presented subject matter. Such information passes on line 29 to a control stage 30 which is the central processor or index register of the entire system and which combines that information with the control information arriving on line 31 from the scanner 25 of the control strip reader 24. The resulting functioning of the processor 30 will be apparent from the following description of specific performance examples.

*Example 1*

Let it be assumed that the student has understood the presented subject matter and that he wishes an advance to the next frame in the teaching scheme. A key is provided on keyboard 27 for him to convey such information to control stage 30. By pressing this key, there are inserted into respective control registers 19 the next frame number as prepared in the particular teaching program. While the particular corresponding frames had been in devices 22 and 24 respectively, according to the programming in the frame of the control strip, they might have functioned to cause the activation of line 34 by stage 30 to insert an audio aid such as tape recorder 33 which offered to the student auditory information simultaneously with the offering of material visually perceivable on screen 23. In addition, the control frame program may have called for the insertion of other aids 33', such as moving pictures, simulators, etc. It is, of course, to be noted that the address of the next frame in the teaching scheme has to be programmed on the immediately proceeding control frame 6, the selection of the next frame being effected by the pressing of the pertinent key on keyboard 27 to insert such address into control registers 19.

*Example 2*

The student has not or has incorrectly understood the presented information and portions of the material have either to be repeated or have to be presented in a different manner and sequence. A key is provided on keyboard 27 for such contingency and when actuated, commands a selection of different frames as programmed for this situation through the action of control stage 30, such selection being effected by the providing of corresponding register numbers for the respective control registers 19 on lines 32. The command in this situation, provided on line 29, is of course combined with particular control information from photosensitive scanning means 25 as abstracted from the program on the control frame 6 being scanned at the time. When such commands are effected, different teaching aids (not shown) whose use obtains in this situation are connected in.

*Example 3*

In Examples 1 and 2, situations were presented where corresponding presentation and control frames were in reading and scanning positions in reading devices 22 and 24, i.e., the presentation and control strips are moved in synchronism. However, there may exist a situation where a material presentation frame 3 has information thereon where the insertion of auxiliary teaching aids has to take place in a coordinated and given chronological sequence. Thus, let it be assumed that in a geography lesson, a map is projected from the presentation frame and the teaching program calls for moving picture information (visual) and auditory information in connection with the lesson to be provided in alternating sequence. In such case, several control frames of the control strip may be chosen to correspond and pertain to a given frame of the presentation strip. In such arrangement, of course, the total amount of bits to be recorded on control frame 6 may be greatly reduced with a commensurate reduction in logical and other necessary circuitry to thereby effect a reduced cost in the manufacture and complexity of the machine.

Similarly, the situation may exist in which several presentation frames are called for by the information on a given control frame. For example, in a music lesson with tape recorder 33 running, the scores for different themes of a musical work may have to be presented sequentially.

Control stage 30 is constructed to enable the production thereby of electrical signals and combinations of electrical signals representing the following information:

(1) Start and stop signals for auxiliary aids such as aids 33, 33'.

(2) Address information such as recording tape addresses of the information desired from a tape recorder 33, a movie projector, or other aids.

(3) Recycling orders and the like.

Keyboard 27 may be provided with keys which comprise a real time controlled sequence combination for provided information as to how well the student has learned a particular lesson, subject and the like.

(1) From the information provided on line 29 in connection with such combination to control stage 30 and a computation therein by suitable computing means, a quantitative efficacy evaluation is effected which is made accessible to a teacher or monitor over a distribution unit 35.

(2) Such same real time information also can indicate to the monitor whether the student properly or randomly operates keyboard 27, i.e., significant and intelligent information will appear only if keyboard 27 is operated properly. If the keyboard is being operated randomly, then the further presentation of material can be halted by suitable control circuitry and, simultaneously, a corresponding annunciatory indication may be given to the monitor, such as with a lamp 36.

In carrying out the invention, both the presentation strips and the control strips may be made of like material with like dimensions, viz., width, perforation size and spacing, frame dimension, interframe distance, etc. Alternatively, and for purposes of simplification, in preparation of film, the film reel for presenting material can immediately be followed by the control reel. In such situations both reels may constitute a continuous single length of film with an intermediate section between the presentation and control portions of the film length. With the latter arrangement, the coding of the presentation portion as well as the coding of the control portion of the film for use in a lesson by similarly constructed teaching machines is enabled. In this situation, the distances between adjacent frames need not be the same and may continuously change from frame step to frame step.

In connection with the photosensitive means 25 in FIG. 6, there are required as many photosensitive devices as there are control bits in a control frame 6. FIG. 7 shows an arrangement in which the number of such devices can be greatly reduced.

Thus there are shown in FIG. 7, the sprocket wheel 7 driven by motor 10, the lines of holes 17, and the edge of film perforations passing over sprockets 8. Strip 39 is the strip to be moved. The arrangement shown in FIG. 7 further includes substantially equispaced holes 40 disposed along the circumferential periphery near the edge of wheel 7 at its motor connection end, the spacing between holes 40 being chosen to be equal to the spacing between the lines of a control frame. A photosensitive device 38 is disposed spaced from and above wheel 7, the light from tube 11 disposed within wheel 7 passing through holes 40 to impinge on photosensitive device 38 whose output is connected to motor 10. With the arrangement of FIG. 7, when the first line of a control frame is scanned, i.e., read off by photosensitive means 25, relay connections of a relay 37 suitably associated with a motor 10 receive a motor movement actuating signal from control stage 30, such signal being extinguished by the signal output from photosensitive device 38. Thus, the reading of each line on a control frame by photosensitive means 25 is accompanied by a signal output from photosensitive device 38 produced by its being subjected to light through one of holes 40. Since the holes 40 are spaced to be synchronized with the lines of control frame 40, each line reading signal to motor 10 from control stage 30 has a corresponding extinguishing signal produced by photosensitive device 38. With the arrangement of FIG. 7, the lines of a control frame can be read sequentially and therefore there is only required an amount of photosensitive devices in means 25 corresponding to the amount of bits, i.e., fields, in a line on a control frame. All of the photosensitive devices described hereinabove may suitably be photoelectric cells.

It will be obvious to those skilled in the art upon studying this disclosure, that teaching apparatus according to our invention permit of a great variety of modifications and hence can be given embodiments other than those particularly illustrated and described herein, without departing from the essential features of our invention and within the scope of the claims annexed hereto.

We claim:

1. In automatically controlled teaching apparatus, strip means having spaced first frames thereon designated by respective different first numbers containing intelligible graphic subject matter, first areas between said first frames and containing a chosen number of information bits thereon for respectively deriving therefrom first binary combinations of electrical signals representing said first numbers, spaced second frames thereon designated by respective different second numbers and containing a plurality of combinations of control bits thereon representing a plurality of steps in a predetermined teaching program pertinent to a particular first frame and the address of the next frame of said program, second areas designated by respective different second numbers between said second frames containing a given number of control bits thereon for respectively deriving therefrom second binary combinations of electrical signals representing said second numbers, a first device for displaying said first frames, a second device for scanning said second frames to produce binary combinations of signals representing said steps, first and second control registers for containing therein settings of said binary combinations of electrical signals representing said frame numbers, means for moving said strip means, said moving means including means for scanning said first and second areas to derive said first and second binary combinations of electrical signals, and control means responsive to the application thereto of the settings in said control registers and said first and second binary electrical signal combinations for halting said moving means upon the matching of said control register settings and said first and second binary combinations, and means for generating a plurality of binary combinations of electrical signals respectively representing different commands, said control means being responsive to the application thereto of said commands and to the combinations of electrical signals representing said steps for effecting said commands, and for carrying out said steps.

2. In automatically controlled teaching apparatus, a first strip having first spaced frames thereon designated by respective numbers containing intelligible graphic subject matter, first areas between said first frames and containing a chosen number of information bits therein for respectively deriving therefrom first binary combinations of electrical signals representing said first numbers, a second strip having second spaced frames thereon designated by respective second numbers and containing a plurality of combinations of control bits for deriving said plurality of binary combinations of electrical signals, each of said last named combinations representing said plurality of steps in a predetermined teaching program for a particular first frame and the address of the next frame of said program, each of said second frames containing the teaching program for a given corresponding first frame, second areas between said second frames, each of said second areas containing said chosen number of bits therein for respectively deriving therefrom second binary combinations of electrical signals representing said second numbers, a first device for displaying said first frames, a second device for scanning said second frames to produce said binary combinations of signals representing said program steps, first and second control registers for concurrently containing therein respective settings of binary combinations representing the numbers of first and second corresponding frames, means for moving said first strip, means for moving said second strip, each of said moving means including means for scanning said first and second areas to derive said first and second combinations of electrical signals respectively, means for generating a plurality of binary combinations of electrical signals respectively representing different commands, and control means both responsive to the application thereto of the settings in said respective control registers and said first and second binary electrical signal combinations for controlling said moving means, and for halting said moving means upon the matching of said respective control registers' settings and said first and second binary combinations of electrical signals respectively, said matching causing the positioning for display and scanning of corresponding first and second frames in said first and second devices respectively, and responsive to the application thereto of said commands and to combinations of electrical signals representing said steps for effecting said commands and for carrying out said steps.

3. In automatically controlled teaching apparatus as defined in claim 2 and further including a plurality of auxiliary teaching devices and means contained in said control means responsive to the application thereto of said binary combinations of electrical signals representing said program steps for actuating said auxiliary devices.

4. In automatically controlled teaching apparatus as defined in claim 3 wherein the application of one of said binary combinations of electrical signals representing a given command to said control means coincident with the application thereto of said binary combinations of electrical signals representing said steps causes a change in the program for teaching the material in a given first frame.

5. In automatically controlled teaching apparatus as defined in claim 3 wherein there is further included computing means in said control means, and means for indicating the results of a computation in said computing means, and wherein a sequence of chosen ones of said command binary combinations of electrical signal is applied to said computing means for effecting said computation, said results being a quantitative evaluation of the teaching efficacy of said program.

6. In automatically controlled teaching apparatus as defined in claim 3 in which each of said moving means comprises a hollow cylindrical sprocket wheel having a light emitting tube disposed therein, at least one tangentially disposed line of spaced holes through the periphery thereof, said holes being equal in number and spacing to the number and spacing of the bits on said areas, said number of photosensitive devices responsive to said light impinging thereon from said tube through said holes, and a motor responsive to the output of said control means.

7. In automatically controlled teaching apparatus as defined in claim 6 wherein said second device is operative to scan said second frame combinations sequentially.

References Cited
UNITED STATES PATENTS

| | | | |
|---|---|---|---|
| 3,121,959 | 2/1964 | Uttal | 35—9 |
| 3,121,960 | 2/1964 | Uttal et al. | 35—9 |
| 3,141,243 | 7/1964 | Chapman et al. | 35—9 |
| 3,210,864 | 10/1965 | Tillotson et al. | 35—9 |

EUGENE R. CAPOZIO, *Primary Examiner.*

R. W. WEIG, *Assistant Examiner.*